(12) United States Patent
Houser et al.

(10) Patent No.: US 11,906,805 B2
(45) Date of Patent: Feb. 20, 2024

(54) FIBER OPTIC CABLE ASSEMBLY WITH PULLING GRIP ASSEMBLY

(71) Applicant: CORNING RESEARCH & DEVELOPMENT CORPORATION, Corning, NY (US)

(72) Inventors: Christopher Shawn Houser, Hickory, NC (US); Charles Gregory Stroup, Lincolnton, NC (US)

(73) Assignee: Corning Research & Development Corporation, Corning, NY (US)

( * ) Notice: Subject to any disclaimer, the term of this patent is extended or adjusted under 35 U.S.C. 154(b) by 182 days.

(21) Appl. No.: 17/495,931

(22) Filed: Oct. 7, 2021

(65) Prior Publication Data

US 2022/0120988 A1   Apr. 21, 2022

Related U.S. Application Data

(60) Provisional application No. 63/092,854, filed on Oct. 16, 2020.

(51) Int. Cl.
*G02B 6/54* (2006.01)
*G02B 6/02* (2006.01)
*G02B 6/38* (2006.01)

(52) U.S. Cl.
CPC ......... *G02B 6/545* (2023.05); *G02B 6/02042* (2013.01); *G02B 6/3849* (2013.01); *G02B 6/3897* (2013.01)

(58) Field of Classification Search
CPC .................................................. G02B 6/545
See application file for complete search history.

(56) References Cited

U.S. PATENT DOCUMENTS

| 4,368,910 A | 1/1983 | Fidrych |
| 4,453,291 A | 6/1984 | Fidrych |

(Continued)

FOREIGN PATENT DOCUMENTS

| DE | 20213015 U1 | 12/2003 |
| EP | 0316535 A2 | 5/1989 |

(Continued)

OTHER PUBLICATIONS

International Search Report and Written Opinion of the International Searching Authority; PCT/US2021/059333; dated Feb. 22, 2022; pp. 14; European Patent Office.

*Primary Examiner* — Chris H Chu
(74) *Attorney, Agent, or Firm* — Adam R. Weeks

(57) ABSTRACT

A fiber optic cable assembly comprises: a cable jacket; distinct groups of optical fibers carried within the cable jacket and extending beyond a first end of the cable jacket; a furcation body positioned on the first end of the cable jacket such that the distinct groups of optical fibers extend beyond the furcation body; and a pulling grip assembly having a proximal end selectively secured to the furcation body, a distal end opposite the proximal end, and an interior between the proximal end and the distal end that contains fiber end sections. The interior of the pulling grip assembly is sealed off from an exterior of the cable assembly to provide sealed protection for the fiber end sections over an ambient temperate range of at least between −20 to 50° C. while applying a tensile load of at least 300 lbs to the distal end of the pulling grip assembly.

20 Claims, 8 Drawing Sheets

(56) References Cited

U.S. PATENT DOCUMENTS

| | | | |
|---|---|---|---|
| 4,460,159 A | 7/1984 | Charlebois et al. | |
| 4,514,005 A | 4/1985 | Fallon | |
| 5,133,583 A | 7/1992 | Wagman et al. | |
| 5,480,203 A | 1/1996 | Favalora et al. | |
| 5,863,083 A | 1/1999 | Giebel et al. | |
| 6,993,237 B2 | 1/2006 | Cooke et al. | |
| 7,869,685 B2 | 1/2011 | Hendrickson et al. | |
| 8,385,712 B2 | 2/2013 | Ahmed | |
| 8,620,130 B2 | 12/2013 | Cooke et al. | |
| 8,630,523 B2 | 1/2014 | Smith et al. | |
| 8,718,425 B2 | 5/2014 | Piña et al. | |
| 9,110,268 B2 | 8/2015 | Leonard et al. | |
| 9,453,982 B2 | 9/2016 | Nhep et al. | |
| 9,608,426 B2 | 3/2017 | Tatat et al. | |
| 10,001,619 B2 | 6/2018 | Thompson et al. | |
| 10,067,310 B2 | 9/2018 | Compton et al. | |
| 10,295,775 B1 | 5/2019 | Zhu et al. | |
| 11,300,749 B2 | 4/2022 | Hendrickson et al. | |
| 2003/0081916 A1* | 5/2003 | Norris | G02B 6/545 385/100 |
| 2008/0131056 A1* | 6/2008 | Isenhour | G02B 6/4465 385/71 |
| 2008/0175548 A1 | 7/2008 | Knecht et al. | |
| 2010/0150504 A1 | 6/2010 | Allen et al. | |
| 2011/0170829 A1* | 7/2011 | Bradley | G02B 6/3849 29/874 |
| 2012/0308184 A1 | 12/2012 | Pina et al. | |
| 2013/0294735 A1 | 11/2013 | Burris et al. | |
| 2014/0086534 A1* | 3/2014 | Lu | G02B 6/3849 385/60 |
| 2015/0241639 A1* | 8/2015 | Lu | G02B 6/3849 385/139 |
| 2015/0362693 A1 | 12/2015 | Nhep et al. | |
| 2018/0067275 A1 | 3/2018 | Levy | |
| 2019/0004273 A1 | 1/2019 | Faulkner et al. | |
| 2021/0132298 A1* | 5/2021 | Petersen | G02B 6/3831 |
| 2021/0302657 A1 | 9/2021 | Petersen et al. | |
| 2022/0283396 A1* | 9/2022 | Houser | G02B 6/4435 |

FOREIGN PATENT DOCUMENTS

| | | | |
|---|---|---|---|
| GB | 2470584 A | 12/2010 | |
| JP | 07-027958 A | 1/1995 | |
| WO | 2009/040567 A1 | 4/2009 | |
| WO | 2010/105674 A1 | 9/2010 | |
| WO | 2013/112396 A1 | 8/2013 | |
| WO | WO-2017146324 A1 * | 8/2017 | H02G 1/08 |
| WO | 2019/010291 A1 | 1/2019 | |
| WO | 2019/079425 A1 | 4/2019 | |
| WO | 2019/079460 A1 | 4/2019 | |

* cited by examiner

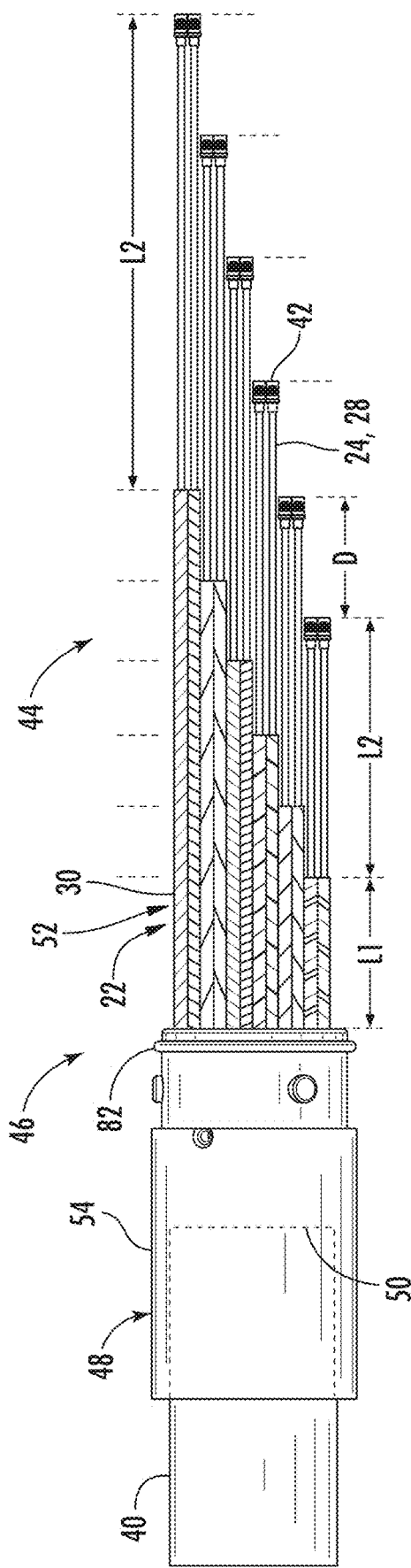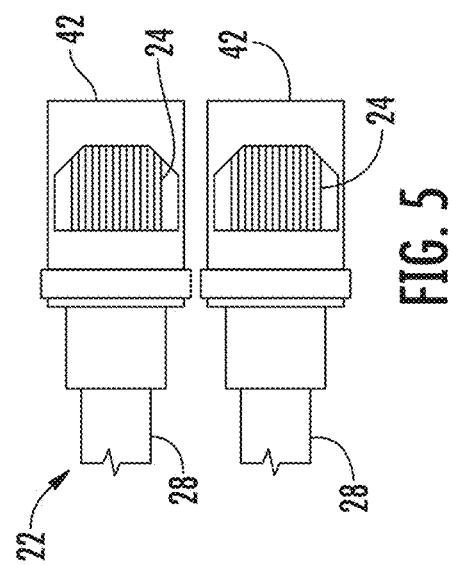

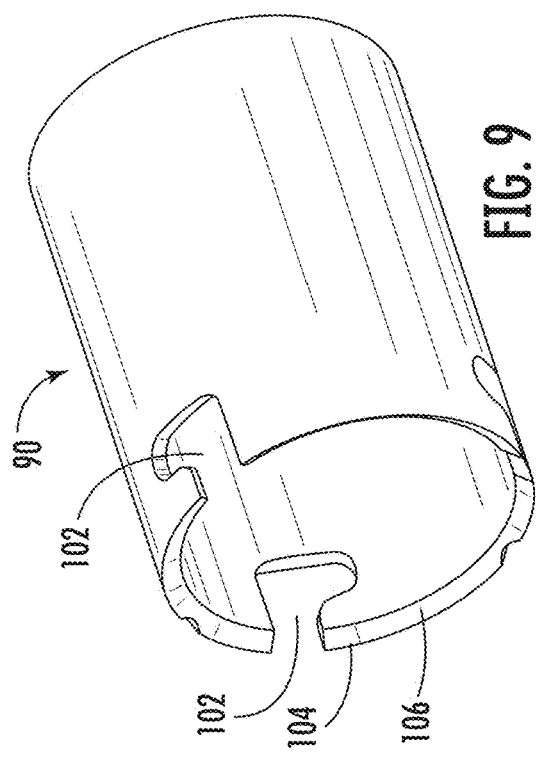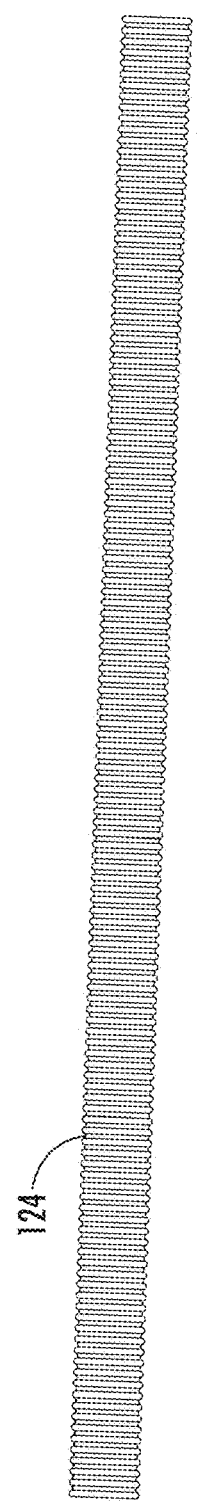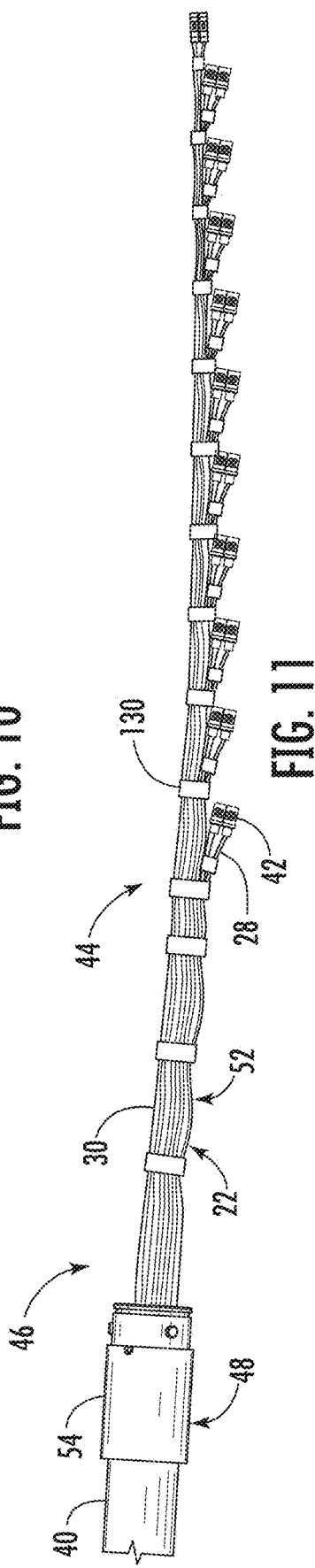

FIBER OPTIC CABLE ASSEMBLY WITH PULLING GRIP ASSEMBLY

PRIORITY APPLICATION

This application claims the benefit of priority of U.S. Provisional Application No. 63/092,854, filed on Oct. 16, 2020, the content of which is relied upon and incorporated herein by reference in its entirety.

BACKGROUND

This disclosure relates generally to optical connectivity, and more particularly to fiber optic cable assemblies that include a pulling grip assembly providing sealed protection for fiber end sections, along with related methods for such fiber optic cable assemblies.

Large amounts of data and other information transmitted over the internet has led businesses and other organizations to develop large scale data centers for organizing, processing, storing, and/or disseminating large amounts of data. Data centers contain a wide range of communication equipment including, for example, servers, networking switches, routers, storage subsystems, etc. Data centers further include a large amount of cabling and equipment racks to organize and interconnect the communication equipment in the data center. For example, optical fiber cables and rack-mounted hardware to support optical connections are used extensively in data centers. Optical fibers can support very high bandwidths with lower signal loss compared to traditional data transmission mediums (e.g., copper wires).

The connections between communication equipment in large-scale data centers is typically not confined to a single building. May modern data centers include multi-building campuses having, for example, one primary or main building and a number of auxiliary buildings in close proximity to the main building. All the buildings on the campus are interconnected by a local fiber optic network. More particularly, each of the auxiliary buildings are typically connected to the main building by one or more high fiber-count optical cables referred to as "trunk cables" or "interconnect cables". Each trunk cable may include thousands of optical fibers. Indeed, fiber counts of 3,456 or higher are now common.

To provide optical connectivity within a building, the optical fibers of an interconnect cable are typically spliced to optical fibers of indoor distribution cables. The splices may be stored and organized in a splice cabinet from which the indoor distribution cables extend. More specifically, the splice cabinet holds numerous splice trays that each receives a group of optical fibers from the interconnect cable that have been spliced to a group of optical fibers associated with the indoor distribution cables. Fusion splicing is commonly used as the primary technique for splicing the two groups of optical fibers together before the splices are stored and organized in the splice trays. The indoor distribution cables exit the splice cabinet and extend to desired locations within the building, such as to designated rows of equipment racks. Connections to the communication equipment in the equipment racks are ultimately made by the indoor distribution cables or other cables that are part of a structured cabling system for the building.

The amount of labor and time for connecting a trunk cable to the IT equipment in the main building on the data center campus is significant. In a typical installation process, it may take two technicians approximately two-weeks of time to fusion splice the optical fibers of a interconnect cable to corresponding optical fibers of indoor cables in the main building. Additionally, fusion splicing is a labor-intensive method for connecting optical fibers that is typically performed under field conditions, as opposed to under more highly controlled factory conditions. Thus, the quality of the splicing and the attenuation of the optical signal through the splice may vary widely depending on the field technicians' skill and experience.

Attempts to address these challenges may involve pre-terminating an interconnect cable with optical connector components that define a connection interface so that splicing is not required in the field. The connection interfaces can instead mate with corresponding connection interfaces (e.g., using an adapter) on indoor cables. However, pre-terminating cables creates its own challenges. In particular, the terminations involve components that may make it difficult to fit a large number of terminated optical fibers into a small space. This is particularly important for data center campuses, as the interconnect cables must typically be pulled through one or more ducts during installation. The number and size (i.e., diameter) of the ducts is limited. Additionally, the intended pathway for the interconnect cable may present routing challenges, requiring significant forces to be applied to route the cable to its intended destination. The pre-terminated ends of optical fibers in the interconnect cable must also be protected from environmental conditions during the routing.

Although various designs for pulling grips (also referred to as "pulling socks") are known to help route fiber optic cables during installation, there remains a need to better address the variety of challenges driven by high fiber-count cables and modern data center environments.

SUMMARY

Embodiments of fiber optic cable assemblies are provided in this disclosure. The fiber optic cable assemblies may be pre-terminated or unterminated, and comprise a pulling grip assembly. Pulling grip assembly designs according to this disclosure are particularly advantageous for pre-terminated fiber optic cable assemblies because of the high degree of protection the pulling grip assembly designs can provide in a small footprint.

According to one embodiment, a pre-terminated fiber optic cable assembly comprises: a cable jacket; distinct groups of optical fibers carried within the cable jacket and extending beyond a first end of the cable jacket; a furcation body positioned on the first end of the cable jacket such that the distinct groups of optical fibers extend beyond the furcation body; a plurality of connection interfaces each terminating one or more respective groups of the distinct groups of optical fibers that extend beyond the furcation body to define pre-terminated fiber end sections of the distinct groups of optical fibers; and a pulling grip assembly having a proximal end selectively secured to the furcation body, a distal end opposite the proximal end, and an interior between the proximal end and the distal end that contains the pre-terminated fiber end sections. The interior of the pulling grip assembly is sealed off from an exterior of the pre-terminated fiber optic cable assembly to provide sealed protection for the pre-terminated fiber end sections. Additionally, the pulling grip assembly is configured to maintain the sealed protection over an ambient temperate range of at least between −20 to 50° C. while applying a tensile load of at least 300 lbs to the distal end of the pulling grip assembly.

Methods of installing a pre-terminated fiber optic cable assembly are also disclosed. According to one embodiment, such a method involves a pre-terminated fiber optic cable assembly according to the preceding paragraph. The cable jacket, the plurality of subunits, and the furcation body are part of a pre-terminated cable on which the pulling grip assembly is initially installed. The method comprises: pulling the pre-terminated cable through at least one duct by applying a tensile load to the distal end of the pulling grip assembly; directing an end portion of the pre-terminated cable into a distribution cabinet while the pulling grip assembly is still installed on the pre-terminated cable; and removing the pulling grip assembly from the pre-terminated cable after said directing. The removing comprises releasing a connection between the proximal end of the pulling grip assembly and the furcation body, and the pulling grip assembly remains assembled during the removing.

According to another embodiment, a fiber optic cable assembly comprises: a cable jacket; distinct groups of optical fibers carried within the cable jacket and extending beyond a first end of the cable jacket; a furcation body positioned on the first end of the cable jacket such that the distinct groups of optical fibers have respective fiber end sections extending beyond the furcation body; and a pulling grip assembly having a proximal end selectively secured to the furcation body, a distal end opposite the proximal end, and an interior between the proximal end and the distal end that contains the fiber end sections. The interior of the pulling grip assembly is sealed off from an exterior of the cable assembly to provide sealed protection for the fiber end sections. Additionally, the pulling grip assembly is configured to maintain the sealed protection over an ambient temperate range of at least between −20 to 50° C. while applying a tensile load of at least 300 lbs to the distal end of the pulling grip assembly.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 4 is a schematic view of an end portion of the interconnect cable of FIG. 2 having subunits pre-terminated with ferrules to form a pre-terminated cable according to one example embodiment.

FIG. 5 is a close-up schematic view of the ferrules associated with two of the subunits in FIG. 4.

FIG. 9 is a perspective view of a coupler of the pulling grip assembly of FIG. 8.

FIG. 10 is a schematic view of a corrugated inner tube of the pulling grip assembly of FIG. 8.

FIG. 11 is a schematic view the end portion of the interconnect cable of FIG. 4 having the subunits organized prior to installing the pulling grip assembly of FIG. 8.

DETAILED DESCRIPTION

Various embodiments will be clarified by examples in the description below. In general, the description relates to a fiber optic cable assembly that includes a cable and a pulling grip assembly (also referred to as simply "pulling grip" or as a "pulling sock") for pulling the cable through ducts or the like. The pulling grip assembly is designed to protect the ends of optical fibers extending from the cable from both forces and environmental conditions (e.g., moisture) that the fiber optic cable assembly may experience during handling, storage, installation, and use. Doing so can be particularly challenging for high fiber-count cables, such as those including 3,456 or more optical fibers that have been pre-terminated with optical connector components (e.g., ferrules) or full optical connectors.

To facilitate discussion and provide context, an exemplary environment and use for high fiber-count cables will first be described. A description of an example high fiber-count, pre-terminated cable will then follow, before ultimately focusing on details of a pulling grip assembly for that cable. The pulling grip assembly may, however, be used in connection with a wide variety of cable designs. The cable designs need not necessarily include high fiber-counts even though aspects of this disclosure may be particularly advantageous for high fiber-counts. Thus, details in this disclosure that are not related to the pulling grip assembly should not be seen as limiting the scope of claims in this disclosure unless specifically recited in those claims.

Figure 1:
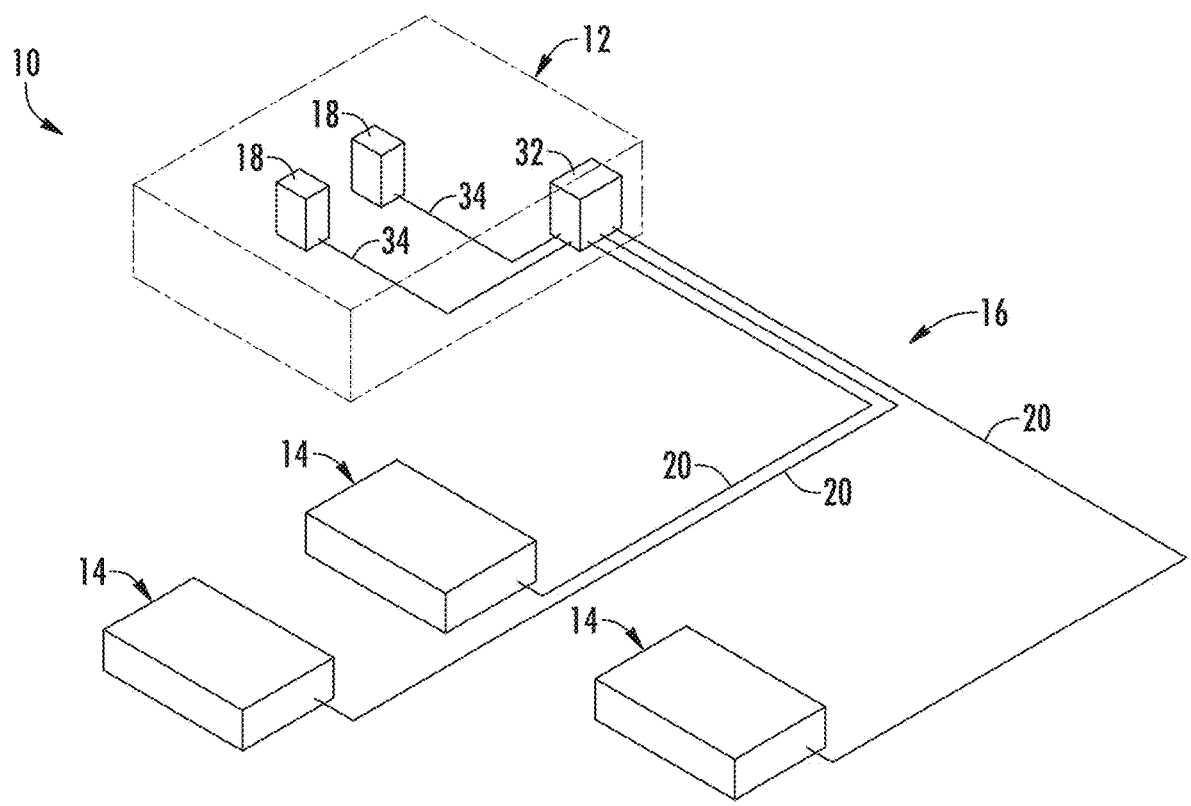
FIG. 1 is a schematic illustration of a data center campus interconnected according to an exemplary embodiment of the disclosure.

As illustrated in FIG. 1, a modern-day data center 10 may include a collection of buildings (referred to as a data center campus) having, for example, a main building 12 and one or more auxiliary buildings 14 in close proximity to the main building 12. While three auxiliary buildings are shown, there may be more or less depending on the size of the campus. The data center 10 provides for a local fiber optic network 16 that interconnects the auxiliary buildings 14 with the main building 12. The local fiber optic network 16 allows communication equipment 18 in the main building 12 to communicate with various communication equipment (not shown) in the auxiliary buildings 14. In the exemplary embodiment shown, the local fiber optic network 16 includes interconnect cables 20 (also referred to as "outside plant cables 20" or "trunk cables 20") extending between the main building 12 and each of the auxiliary buildings 14.

The interconnect cables 20 may be similar to any of the cables described in International Patent Application Publication No. WO 2019/010291 A1 ("the '291 publication"), the disclosure of which is fully incorporated herein by reference. Thus, although a brief description of one of the interconnect cables 20 is provided below to introduce aspects related to this disclosure, reference can be made to the '291 publication for an understanding of other aspects and variations.

Figure 2:
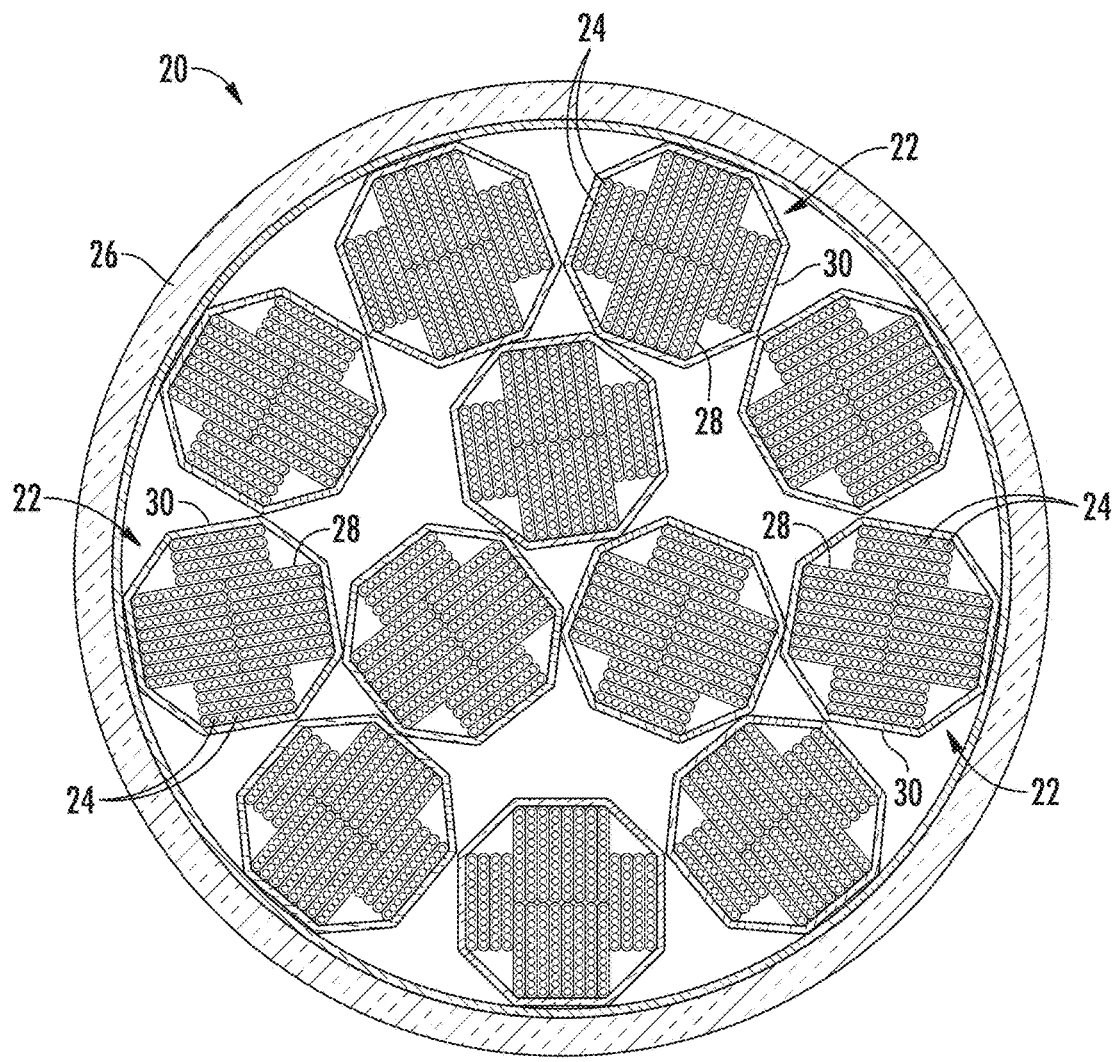
FIG. 2 is a cross-sectional view of an exemplary interconnect cable that interconnects buildings on the data center campus.

As illustrated in FIG. 2, an example one of the interconnect cables 20 generally includes a high fiber-count arrangement of optical fibers 24 (e.g., 2,880 or 3,456 or more optical fibers) for passing data and other information through the local fiber optic network 16. The interconnect cable 20 includes a plurality of subunits 22, and each subunit 22 is configured to carry a pre-selected number of optical fibers 24. Although the interconnect cable 20 is shown as including twelve subunits 22, the number of subunits 22 may be more or less than this number in alternative embodiments. The subunits 22 may be arranged within an outer protective sheath 26 (also referred to as "outer cable jacket 26" or simply "cable jacket 26" or "outer jacket 26"), as is generally known in the industry. As mentioned above, each of the subunits 22 is configured to carry a pre-selected number of optical fibers 24. By way of example and without limitation, each subunit 22 may be configured to carry 144 or 288 optical fibers 24. It should be recognized, however, that more or less optical fibers 24 may be carried by each of the subunits 22.

The optical fibers 24 in the subunits 22 may be arranged in different groups (i.e., distinct groupings, even though the groupings may have the same number of optical fibers 24). As an example, the optical fibers 24 may be configured as a plurality of optical fiber ribbons 28 ("ribbons 28"). Each ribbon 28 includes a plurality of the optical fibers 24 arranged in a generally side-by-side manner (e.g., a linear array, as shown, or a rolled/folded array). Such ribbons are generally known and thus will not be described further in this disclosure. Each ribbon 28 may include, for example, eight, twelve, sixteen, or any other number of the optical fibers 24. The ribbons 28 of a subunit 22 may be arranged within a subunit sheath 30 ("subunit jacket 30"), which may be a thin layer of material that has been extruded over the ribbons 28.

In the example illustrated in FIG. 2, the interconnect cables 20 from the auxiliary buildings 14 are routed to a distribution cabinet 32 (also referred to as "distribution enclosure 32") housed in the main building 12. In alternative embodiments, there may be multiple distribution cabinets 32 in the main building for receiving the interconnect cables 20. Thus, there may be one or more distribution cabinets 32.

Figure 3:
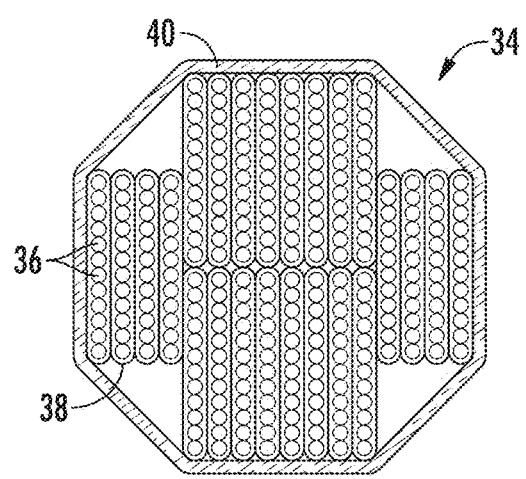
FIG. 3 is a cross-sectional view of one example of an indoor cable used within buildings of the data center campus shown in FIG. 1.

Within the main building 12, a plurality of indoor fiber optic cables 34 ("indoor cables 34") are routed between the communication equipment 18 and the one or more distribution cabinets 32. In an exemplary embodiment and as illustrated in FIG. 3, each of the indoor cables 34 may be configured similar to the subunits 22, at least in terms of fiber count and fiber groupings, and thereby be configured to carry a pre-selected number of optical fibers 36. By way of example and without limitation, each indoor cable 34 may be configured to carry 144 or 288 of the optical fibers 36. It should be recognized, however, that more or less optical fibers 36 may be carried by each of the indoor cables 34.

Similar to the optical fibers 24 of the subunits 22, the optical fibers 36 in the indoor cables 34 may be configured as a plurality of optical fiber ribbons 38 ("ribbons 38"). Thus, each ribbon 38 may include a plurality of optical fibers 36 arranged in a generally side-by-side manner (e.g., in a linear array or in a rolled/folded array). Again, such ribbons 38 are generally known in and thus will not be described further in this disclosure. Each ribbon 38 may include, for example, eight, twelve, sixteen, or any other number of the optical fibers 36. The ribbons 38 of an indoor cable 34 may be arranged within an outer protective sheath 40 (also referred to as "cable outer jacket 40" or simply "cable jacket 40"), as is generally known in the industry.

Although only the interior of the main building 12 is schematically shown in FIG. 4 and discussed above, each of the auxiliary buildings 14 may house similar equipment for similar purposes. Thus, although not shown, each of the interconnect cables 20 may be routed to one or more distribution cabinets 32 in one of the auxiliary buildings 14 in a manner similar to that described above. Furthermore, each of the auxiliary buildings 14 may include indoor cables 34 that extend between communication equipment 18 and the one or more distribution cabinets 32 of the auxiliary building 14.

In accordance with an aspect of this disclosure, at least one of the interconnect cables 20 extending between buildings 12, 14 and at least some of the indoor cables 34 within the buildings 12, 14 may be pre-terminated. That is, at least one of the interconnect cables 20 has at least one end where the optical fibers 24 of that that interconnect cable 20 are terminated by a connection interface prior to being sent out into the field for installation in the local fiber optic network 16, such that the optical fibers 24 have pre-terminated fiber end sections. Likewise, at least some of the indoor cables 34 (e.g., those intended to be coupled to the subunits 22 of the interconnect cable(s) 20 that are pre-terminated) have at least one end where the optical fibers 36 are terminated by a connection interface prior to being sent out into the field for installation in the local fiber optic network 16, such that the optical fibers 36 have pre-terminated fiber end sections. The terminations of the interconnect cable(s) 20 and indoor cables 34 instead occur during their respective manufacture (i.e., as part of a cable assembly manufacturing process). Thus, the word "pre-terminated" is used in this disclosure to refer to terminations of optical fibers that take place by the manufacturer of the resulting cable assembly, prior to deployment to "the field" (customers, customer sites, etc.).

As used in this disclosure, "connection interface" refers to an optical connector, optical connector sub-assembly, or one or more optical connector components, such as ferrules, that facilitate coupling of the optical fibers on which they are installed to other optical fibers that are terminated with a same or different connector interface. In one embodiment, for example, the interconnect cables 20 may be pre-terminated with a plurality of ferrules. Each ribbon 28 may be terminated with a respective ferrule, such as 12-fiber ribbons each being terminated with a respective 12-fiber MT ferrule. Alternatively, groups of two or more ribbons 28 may be terminated with the same ferrule, such as groups of two 12-fiber ribbons each being terminated with a respective 24-fiber MT ferrule. There does not need to be a connector housing (also referred to simply as a "housing", or as "connector body" or simply "body") receiving the ferrule. It may just be the ferrule terminating the group(s) of optical fibers, or just the ferrule and components other than a connector housing such that the connection interface itself remains something less than an optical connector. As is known in the industry, optical connectors are designed provide two primary functions: alignment of optical fibers for optical coupling, and mechanical retention to maintain that alignment. A ferrule is typically the primary component for optical alignment purposes, and the connector housing is typically the primary component for retention purposes since it typically includes a coupling mechanism (e.g., a latch feature for cooperating with a complementary latching feature of an adapter). The connector housing defines at least one mechanical reference plane or datum for retention. A connection interface not having such a connector housing is considered an incomplete optical connector in this disclosure.

FIG. 4 schematically illustrates an end portion 44 of one of the interconnect cables 20 pre-terminated with a plurality of ferrules 42 to form a pre-terminated cable 46 (for convention, "end portion 44" will also be used in this disclosure to refer to an end portion of the pre-terminated cable 46). The termination involves not only the installation of ferrules 42, but also preparing the end portion 44 of the interconnect cable 20 for such installation. To this end, the pre-terminated cable 46 includes a furcation body 48 associated with a first end 50 of the cable jacket 26. For example, the furcation body 48 may be installed on the first end 50 such that the cable jacket 26 ends within the furcation body 48. The furcation body 48 represents a "breakout", "branching", or "fanout" point on the interconnect cable 20, as end sections 52 of the subunits 22 extend from the furcation body 48 and beyond the first end 50 of the cable jacket 26 so that the subunits 22 have more freedom to spread out. Various types of furcation bodies are known. In the embodiment shown, and as will be described in further detail below, the furcation body 48 comprises a shell 54 positioned on the first end 50 of the cable jacket 26 and polymer material filling the shell 54 (around the subunits 22). The polymer material may be a cured adhesive, such as epoxy, so that the shell 54 is secured to the cable jacket 26 and at least some of the subunit jackets 30.

In the embodiment shown in FIG. 4, the end sections 52 of the subunits 22 each include the associated subunit jacket 30 extending a certain length from the shell 54 of the furcation body 48. The associated group of optical fibers 24 then extend a certain length from (i.e., beyond) the associated subunit jacket 30. The optical fibers 24 are pre-terminated with connection interfaces (ferrules 42), forming pre-terminated fiber end sections, and in this embodiment, the optical fibers 24 are in a ribbonized form before such terminations. For convenience, only a representative ribbon 28 and representative ferrule 42 is schematically shown for each subunit 22 in FIG. 4. A close-up of the representative ribbon 28 and representative ferrule 42 for two of the subunits 22 is schematically shown in FIG. 5. As mentioned above, each subunit 22 may actually include a plurality of ribbons 28, such as twelve ribbons 28 that each have twelve optical fibers 24 (144 fiber count per subunit 22), twenty-four ribbons 28 that each have twelve optical fibers 24 (288 fiber count per subunit 22), or the like.

Referring back to FIG. 4, the end sections 52 of the subunits 22 are grouped in pairs, with the end sections 52 of a given pair having substantially the same length. For example, the lowermost pair in FIG. 4 includes the subunit jackets 30 extending a length L1 from the shell 54 of the furcation body 48, and the optical fibers 24 extending a length L2 from the subunit jacket 30. The total length of the end section 52 (i.e., L1+L2) may be referred to as the "leg length". The different pairs of end sections 52 have different leg lengths to provide a staggered arrangement of the ferrules 42. This staggering allows the pre-terminated cable 46 to be placed within a smaller pulling grip assembly (compared to if there were no staggering), and therefore, fit within smaller ducts or the like.

In FIG. 4, each successive group of end sections 52 has a leg length that is a distance D longer than the leg length of the preceding group. Thus, each group of end sections 52 is D longer than the previous group such that there is substantially uniform (i.e., uniform or intended to be uniform) staggering of the different groups of the ferrules 42. In alternative embodiments, the staggering may be non-uniform. The different leg lengths may be due to the subunit jackets 30 extending further from the shell 54 of the furcation body 48. Thus, the length L2 that the optical fibers 24 extend beyond the corresponding subunit jacket 30 may remain substantially the same (i.e., the same or intended to be the same). A consistent length of exposed ribbons 28 may allow consistent processing by the manufacturer of the pre-terminated cable 46 when terminating the optical fibers 24. In other words, termination processes may be based on a certain exposed length of each ribbon 28 (e.g., for fixtures, stripping equipment, etc.). When that length is provided, the termination processes may be performed in a repeatable manner. Alternative embodiments without consistent lengths of exposed ribbons 28 are nevertheless within the scope of this disclosure as well. Further, in some embodiments involving different cable designs, optical fibers (in a ribbonized or non-ribbonized form) may not have exposed/uncovered end sections.

Figure 6:
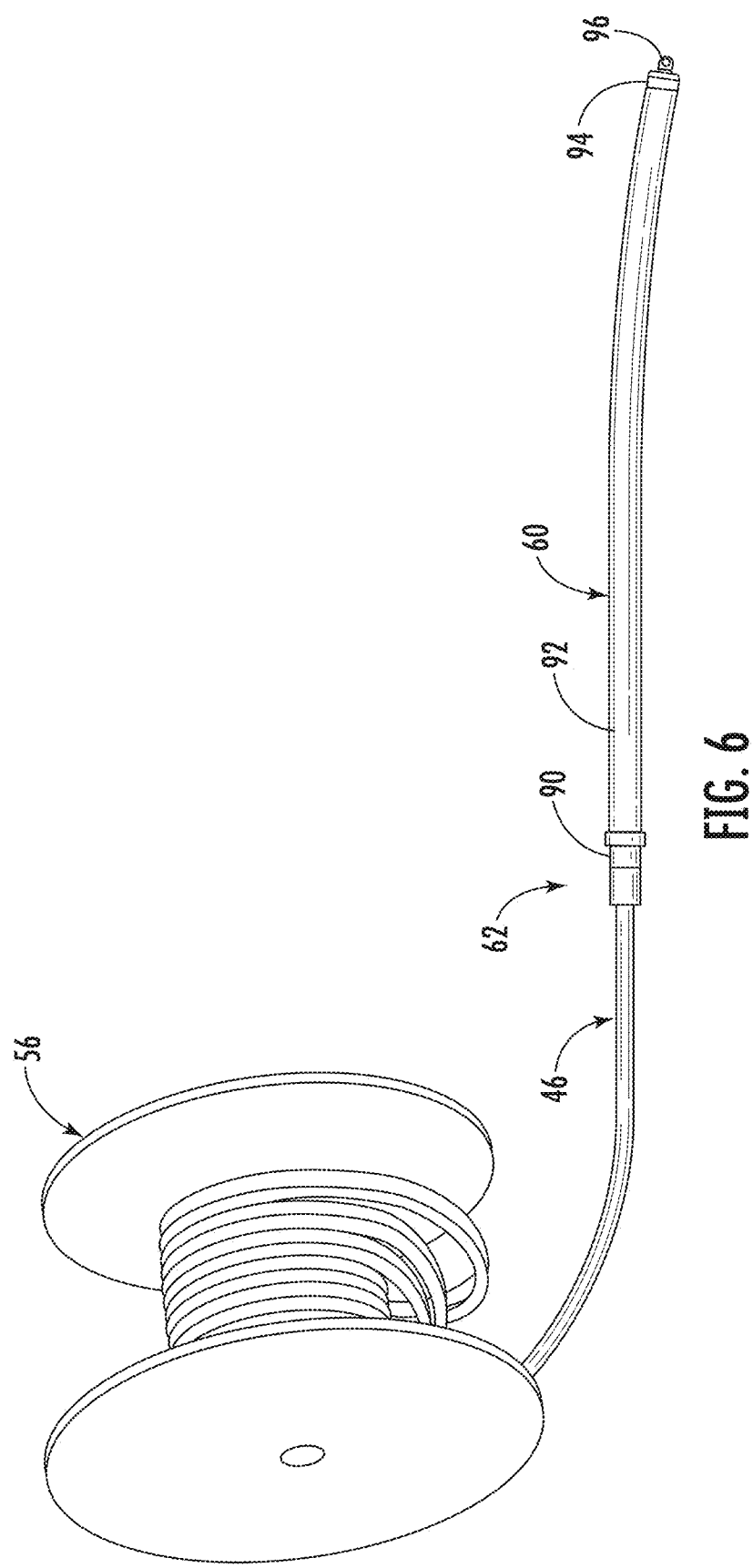
FIG. 6 is a perspective of the interconnect cable of FIG. 2 stored on a cable reel and a pulling grip assembly ("pulling grip") covering the end portion of the interconnect cable of FIG. 4.

FIG. 6 illustrates the pre-terminated cable 46 on a reel 56 and an example of a pulling grip assembly 60 (also referred to as "pulling grip 60" or "pulling sock 60") installed over an end portion of the pre-terminated cable 46 (e.g., the end portion 44 represented in FIG. 4) to form a pre-terminated fiber optic cable assembly 62 ("cable assembly 62"). The pulling grip assembly 60 covers all of the ferrules 42 associated with the end portion 44 of the pre-terminated cable 46. It has already been mentioned how the staggering of the ferrules 42 can help minimize the footprint of the pulling grip assembly 60. For a given pulling grip design, the maximum width/diameter can be less than what it would need to be to accommodate the interconnect cable 20 being pre-terminated with assemblies considered to be complete optical connectors. While the design of the pre-terminated cable 46 may contribute an overall smaller footprint for the large number of pre-terminated optical fibers, the pulling grip assembly 60 complements this design by likewise having a small footprint to provide protection for a high density of pre-terminated optical fibers. Despite the small footprint, the protection may be more than what is typically required for conventional fiber optic cable assemblies due to the larger number of optical fibers 24, incomplete optical connectors that terminate the optical fibers 24, exposed optical fiber ribbons 28, the use in outdoor environments, and/or other considerations. Both the furcation body 48 and the pulling grip assembly 60 according to this disclosure have designs that may help realize these advantages.

Figure 7:
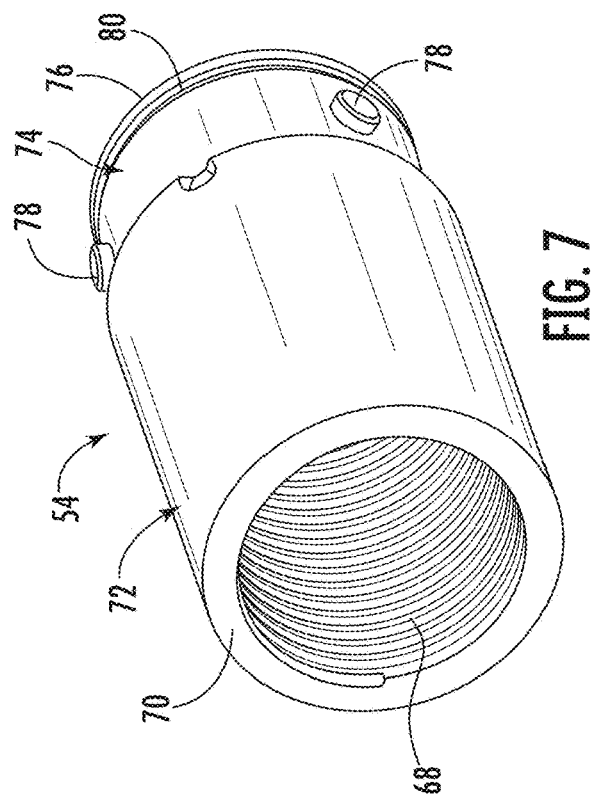
FIG. 7 is a perspective view of a shell of a furcation body for the pre-terminated cable of FIG. 4.

In particular, FIG. 7 illustrates the shell 54 of the furcation body 48 in further detail. The shell 54 in the embodiment shown is a short cylindrical tube received over the first end 50 of the cable jacket 26. The shell 54 has an inner diameter that is the same or less than the outer diameter of the cable jacket 26. Threads 68 may be provided on some or all of an internal wall of the shell 54 to help secure the shell 54 to the cable jacket 26. For example, rotating the shell 54 when placing it onto the first end 50 of the cable jacket 26 may help advance the shell 54 relative to the cable jacket 26, especially when the shell 54 has an inner diameter less than the outer diameter of the cable jacket 26. The shell 54 may also be formed from a material that is more rigid than the material of the cable jacket 26, such that the threads 68 deform or otherwise "grip" onto the cable jacket 26 during installation. In some embodiments, the shell 54 may be comprised of metal (e.g., stainless steel), and the cable jacket 26 may be comprised of polymer material (e.g., polyvinyl chloride).

The shell 54 has a first end 70 that first receives the cable jacket 26 when the shell 54 is installed onto the cable jacket 26. The first end 70 is part of a first portion 72 of the shell 54, which also includes a second portion 74 defining a second end 76 of the shell 54 that is opposite the first end 70. The second portion 74 in the embodiment shown has a reduced outer diameter compared to the first portion 72 and includes features (e.g., bosses 78) for interfacing with the pulling grip assembly 60. Referring to both FIGS. 4 and 7, the shell 54 also includes a groove 80 in the second portion 74 for accommodating a first seal 82 (e.g., o-ring).

Figure 8:
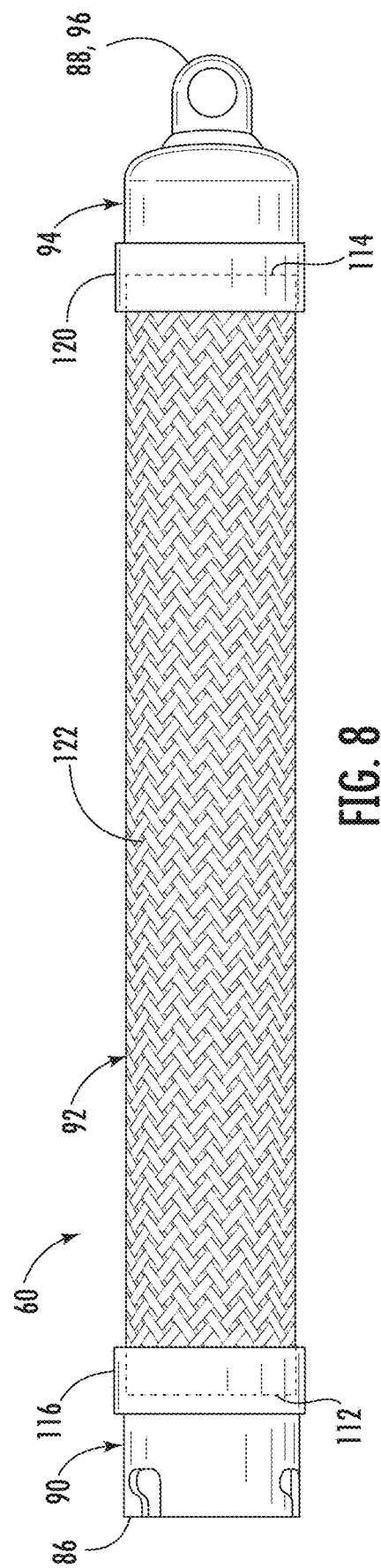
FIG. 8 is a schematic view of an example embodiment of the pulling grip assembly of FIG. 6.

FIG. 8 illustrates one embodiment of the pulling grip assembly 60 in isolation. As will be appreciated, the figures in this disclosure are not drawn to scale, and FIG. 8 in particular is a schematic representation for one embodiment of the same pulling grip assembly 60 shown in FIG. 6. In general, the pulling grip assembly 60 includes a proximal end 86 configured to be selectively secured to the furcation body 48, a distal end 88 opposite the proximal end 86, and an interior configured to contain the pre-terminated fiber end sections of the pre-terminated cable 46. The proximal end 86 in the particular embodiment shown is defined by a coupler 90. A tube 92 extends from the coupler 90 to define the majority of the interior of the pulling grip assembly 60, and an end cap 94 is secured to the tube 92 to form a closed end of the pulling grip assembly 60. The coupler 90 and the tube 92 will be discussed in further detail below. The end cap 94, which includes a pulling eye 96 that defines the distal end 88 of the pulling grip assembly 60, will be understood in the context of discussing these other components.

For a better understanding of the coupler 90, additional reference can be made to FIG. 9, which illustrates the coupler 90 in isolation. Similar to the shell 54, the coupler 90 in the embodiment is a short cylindrical tube. The coupler 90, however, has an inner diameter that is substantially the same as (within 5% of) the outer diameter of the second portion 74 of the shell 54. The coupler 90 is designed to be closely received over the second portion 74 of the shell 54, and includes slots 102 for accommodating the bosses 78. The slots 102 are L-shaped to provide a bayonet connection with the shell 54. To facilitate positioning the coupler 90 on the second portion 74 of the shell 54 despite the close fit and/or to facilitate moving the coupler 90 over the first seal 82, a first end 104 of the coupler may include a chamfered edge 106 leading to an inner wall 108 of the coupler 90.

Referring back to FIG. 8, the tube 92 in the embodiment shown includes a first end 112 received over at least a portion of the coupler 90 and a second end 114 received over at least a portion of the end cap 94. The first end 112 of the tube 92 is secured to the coupler 90 in a manner that forms a seal ("second seal") between these two components. For example, the coupler 90 and the tube 92 may each be comprised of metal (e.g., stainless steel) so that the first end 112 of the tube 92 may be welded to the coupler 90 to form the associated seal. A ring 116 may be received on the coupler 90 over the connection between the coupler 90 and tube 92 to provide additional reinforcement, sealing, and/or protection. For example, the ring 116 may likewise be comprised of metal and include one side welded to the coupler 90. Thus, the ring 116 forms a seal ("third seal") with the coupler 90 and extends over the second seal between the coupler 90 and the tube 92. In some embodiments, another side of the ring 116 may be welded to the tube 92 itself. In alternative embodiments, the tube 92 may be secured to the coupler 90 in a different manner, either permanently or non-permanently (i.e., selectively removable).

The second end 114 of the tube shown 92 in FIG. 8 is secured to the end cap 94 in a similar manner. In other words, the second end 114 of the tube 92 is secured to the end cap 94 in a manner that forms a seal ("fourth seal") between these two components. For example, the tube 92 and the end cap 94 may each be comprised of metal (e.g., stainless steel) so that the second end 114 of the tube 92 may be welded to the end cap 94 to form the fourth seal. A ring 120 may be received on the end cap 94 over the connection between the tube 92 and the end cap 94 to provide additional reinforcement, sealing, and/or protection. For example, the ring 120 may likewise be comprised of metal and include one side welded to the end cap 94. Thus, the ring 120 forms a seal ("fifth seal") with the end cap 94 and extends over the fourth seal between the tube 92 and the end cap 94. In some embodiments, another side of the ring 120 may be welded to the tube 92 itself. In alternative embodiments, the tube 92 may be secured to the end cap 94 in a different manner, either permanently or non-permanently (i.e., selectively removable), and either the same or differently as the connection as between the first end 112 of the tube 92 and the coupler 90.

The tube 92 in FIG. 8 is shown as comprising a braided material. The braided material may actually be part of a braided cover 122 received over an inner tube. For example, the tube 92 may comprise a corrugated metal inner tube 124 (schematically shown in FIG. 10) and the braided cover 122, which may also be metal. The braided cover 122 may be secured to the inner tube 124 at the first end 112 and the second end 114 of the tube 92 by welding and/or using an appropriate fitting (not shown). In this regard, the tube 92 may have a construction similar to metal hoses (e.g., stainless steel hoses).

An example installation of the pulling grip assembly 60 onto the pre-terminated cable 46 to form the cable assembly 62 will now be described. Beginning with FIG. 11 the end portion 44 of the pre-terminated cable 46 is first prepared for the installation by organizing the end sections 52 of the subunits 22. As mentioned above in connection with FIG. 4, the subunits 22 may be grouped in pairs, with the different pairs having different leg lengths to provide a staggered arrangement of the ferrules 42. Like FIG. 4, FIG. 11 is schematic in nature and only illustrates a representative ferrule 42 per subunit 22 for convenience, when in reality each subunit 22 may include a plurality of ribbons 28 and ferrules 42. Tape, hook-and-loop fasteners (e.g., Velcro®), or other material may be used as bands 130 at various points along the length of the end portion 44 of the pre-terminated cable 46. For example, the subunits 22 of a given pair of subunits 22 may be banded together, and this pair of subunits 22 then banded to other pairs of subunits 22 that have longer leg lengths. The bands 130 may be applied to the subunit jackets 30. Alternatively or additionally, groups of the ribbons 28 may be banded together and/or banded to other groups of the ribbons 28.

Once the end sections 52 have been organized, they may be wrapped or otherwise covered by protective material. For example, a plastic wrap or cover (not shown) may be placed over the end portion 44 of the pre-terminated cable 46 and secured to the furcation body 48 (e.g., by tape, adhesive, or the like). The plastic wrap or cover may even comprise a heat-shrink structure in some embodiments to further help hold the end sections 52 of the subunits 22 close together and to provide protection from water or dust/debris.

Next, the pulling grip assembly 60 (FIG. 8) may be installed onto the pre-terminated cable 46. As can be appreciated, the pulling grip assembly 60 may be provided as a pre-manufactured ("pre-engineered") solution. The various components of the pulling grip assembly 60 discussed above can be assembled together independently of the pre-terminated cable 46. Installation may simply involve positioning the pulling grip assembly 60 over the prepared end portion 44 of the pre-terminated cable 46 and securing the pulling grip assembly 60 to the furcation body 48. For example, the coupler 90 of the pulling grip assembly 60 may be advanced over the first ferrule(s) 42 of the pre-terminated cable 46. As the coupler 90 is further advanced along the length of the end portion 44 of the pre-terminated cable 46 toward the furcation body 48, the ferrules 42 are received in the tube 92. Eventually all of the pre-terminated fiber end sections of the pre-terminated cable 46 are contained in the interior of the pulling grip assembly 60.

Figure 12:
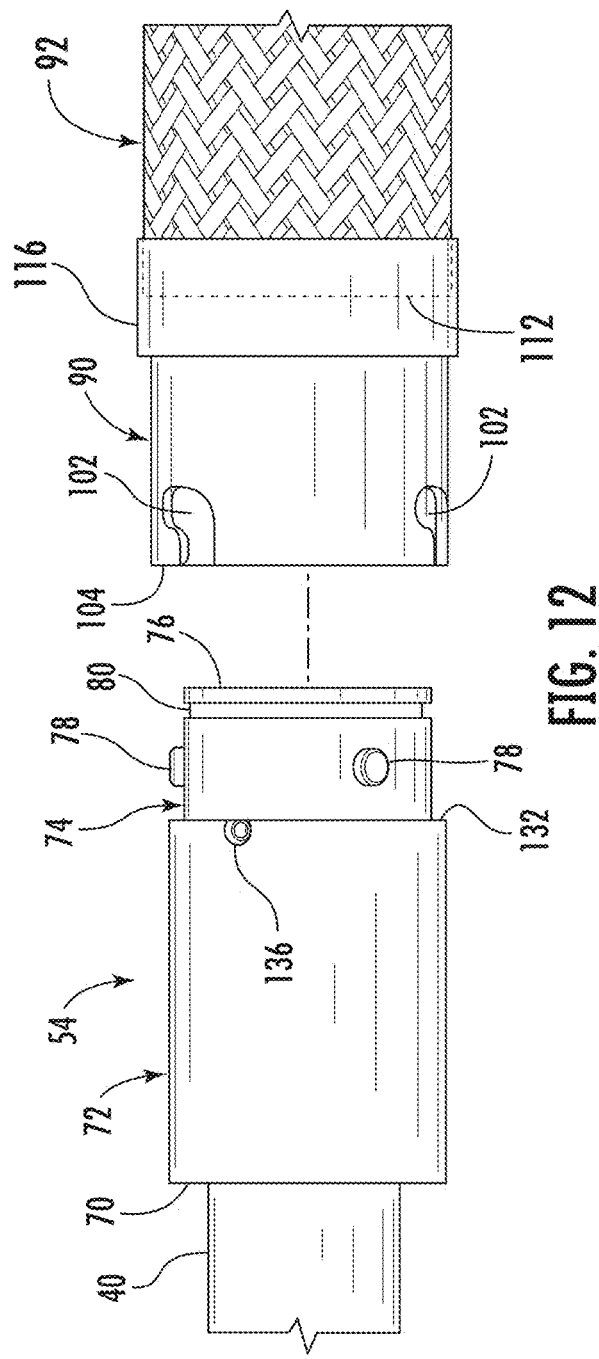
FIGS. 12 and 13 are schematic views illustrating the coupler of FIG. 9 being selectively coupled to the shell of FIG. 7.
Figure 13:
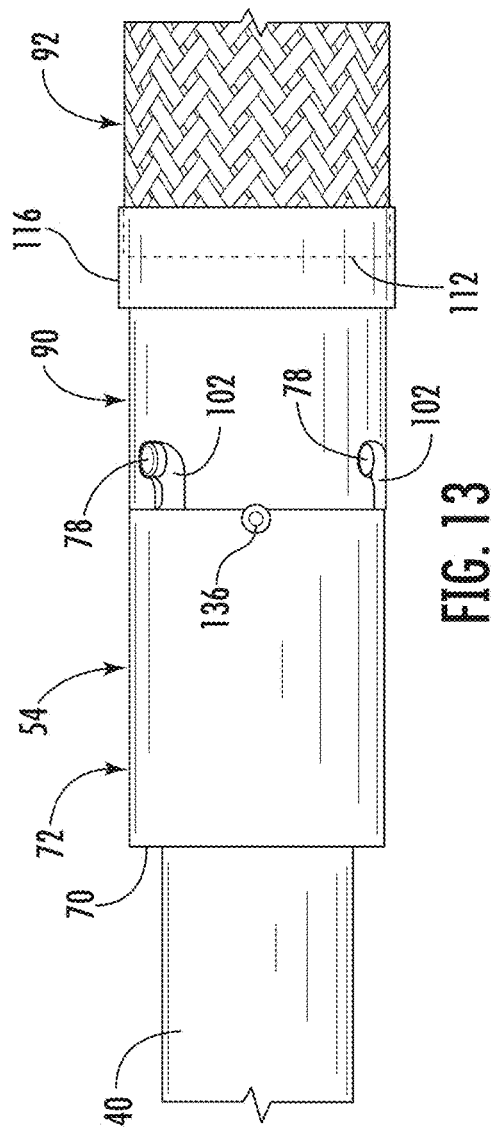

FIGS. 12 and 13 illustrate one example of how the pulling grip assembly 60 may be secured to the furcation body 48. As mentioned above, the coupler 90 of the pulling grip assembly 60 may be received over the second portion 74 of the shell 54. The first seal 82 is compressed between the coupler 90 and the shell 54, but remains seated in the groove 80 as the coupler 90 is advanced over the second portion 74. Additionally, the slots 102 in the coupler 90 are initially aligned with the bosses 78 on the second portion 74 of the shell 54 to allow coupler 90 to be advanced over the second portion 74. Depending on the design of the slots 102, the coupler 90 is rotated/twisted relative to the shell 54 during and/or after its movement over the second portion 74. Such rotation brings the bosses 78 into an end portion of the slots 102 that extends generally transverse to a longitudinal axis of the coupler 90, effectively establishing a bayonet connection. In its fully advanced position over the second portion 74 of the shell 54, the coupler 90 may abut a shoulder 132 defined between the first portion 72 of the shell 54 and the second portion 74. The first portion 72 of the shell 54 may include a threaded hole 136 for receiving a set screw (not shown) having head large enough to extend over a portion of the coupler 90. Such a set screw may be used to apply radial force to the coupler 90 to help maintain the coupler 90 in the rotated, fully-installed position.

In the field (e.g., on the campus of the data center 10), the cable assembly 62 may be routed from one building (main building 12 or auxiliary building 14) to another using the pulling grip assembly 60. The pulling eye 96 provides an attachment point for appropriate equipment (not shown) to pull the pre-terminated cable 46 through ducts that extend into and out of the buildings, and possibly between the buildings. It was mentioned above that the design of the pulling grip assembly 60 may provide for a small footprint yet at the same time protect a large number of pre-terminated optical fibers. In some embodiments, for example, the pulling grip assembly 60 may have a maximum outer diameter of less than 1.34 inches (53 mm) measured in a plane perpendicular to a longitudinal axis of the pulling grip assembly 60, yet still protect at least 2,880 pre-terminated fiber end sections (or, as with the pre-terminated fiber optic cable 46, at least 3,456 pre-terminated fiber end sections). The maximum outer diameter may be defined by the coupler 90 or, if present, the ring 116 and/or the ring 120. The pre-terminated fiber optic cable 46 has a maximum outer diameter that is no larger than the pulling grip assembly 60. As a result, at least three cable assemblies 62 may be pulled through a duct that has an inner diameter of approximately 4 inches (102 mm), which is a common size duct on many data center campuses.

Advantageously, in addition to a small outer diameter, the pulling grip assembly 60 may have a relatively small length when considering the large number of pre-terminated fiber end sections contained within the pulling grip assembly 60. For example, in some embodiments, the pulling grip assembly 60 may have a length between its proximal end 86 and distal end 88 that is less than 120 inches (3.05 m), as measured along a longitudinal axis of the pulling grip assembly 60, despite protecting at least 2,880 or at least 3,456 pre-terminated fiber end sections (each associated with a 12-fiber or 24-fiber MT ferrule 42). The relatively small length of the pulling grip assembly 60 facilities its removal from the cable assembly 62 after being used to pull the pre-terminated cable 46 to its intended location.

Figure 14:
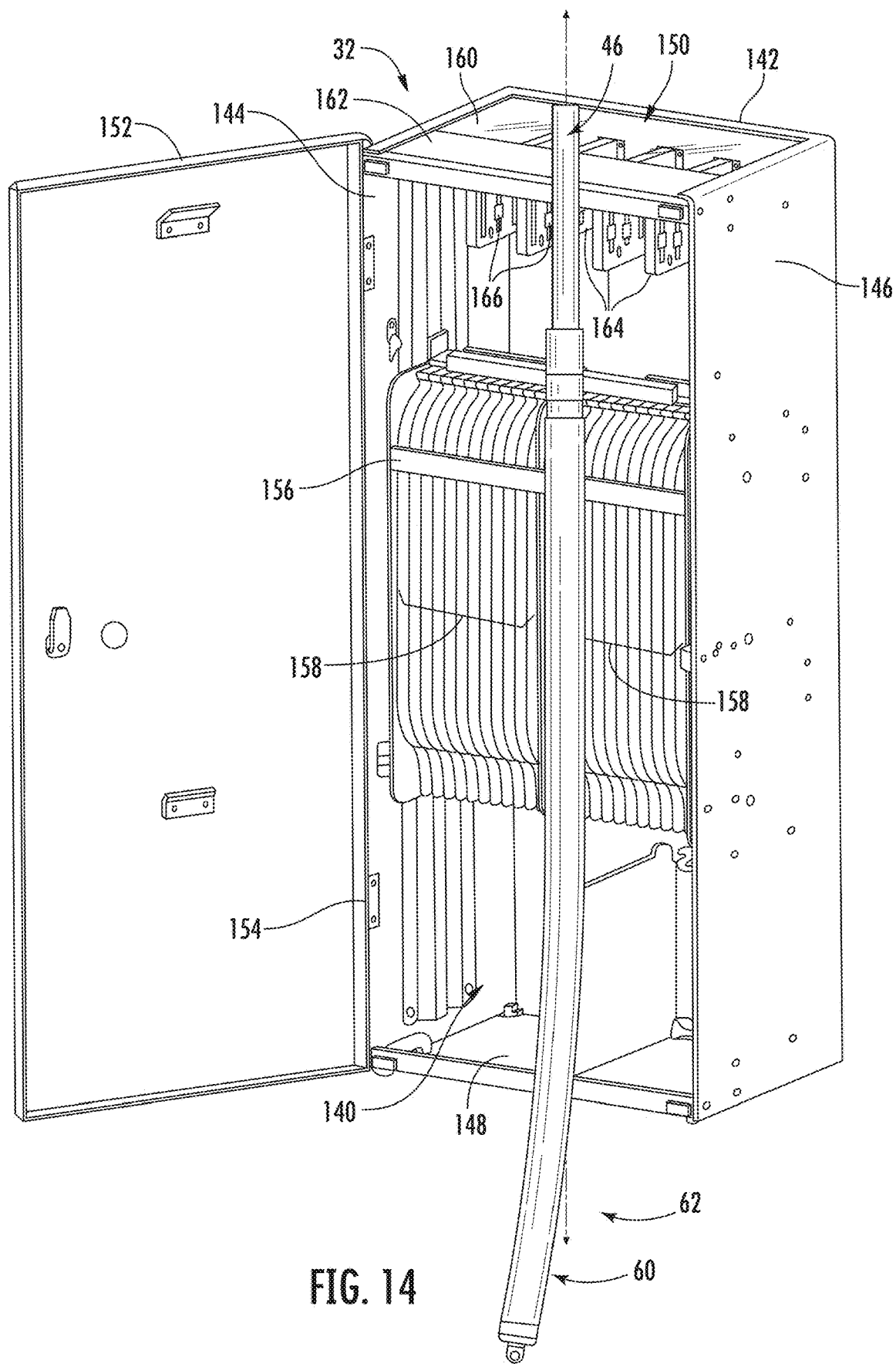
FIG. 14 is a perspective view of one example of a distribution cabinet used in the data center campus of FIG. 1.

In particular, ultimately the cable assembly 62 may be pulled to equipment intended to facilitate and store connections to the pre-terminated fiber end sections of the pre-terminated cable 46. To this end, FIG. 14 illustrates the pulling grip assembly 60 superimposed on one possible embodiment for the distribution cabinets 32 mentioned above in connection with FIG. 4. The distribution cabinet 32 may be similar to embodiments described in PCT Patent Application Publication Nos. WO 2019/079460 A1 ("the '460 publication") and WO 2019/079425 A1 ("the '425 publication"), the disclosures of which of fully incorporated herein by reference. Indeed, FIG. 14 generally corresponds to FIG. 1 of the '425 publication such that reference can be made to the '425 publication for a more complete understanding of aspects not discussed below. Only a brief overview is provided below before focusing on differences from the '425 publication that are specific to this disclosure.

As shown in FIG. 14, the distribution cabinet 32 includes various walls that are assembled together to define an interior volume 140. In particular, the distribution cabinet 32 includes a rear wall 142, a first side wall 144, and a second side wall 146 coupled to opposite sides of the rear wall 142, and a lower wall 148 and an upper wall 150 respectively coupled to a top and bottom of each of the rear wall 142, the first side wall 144, and the second side wall 146. A front door 152 is pivotally coupled to the first side wall 144 (e.g., by hinges 154) to provide selective access to the interior volume 140. The distribution cabinet 32 also includes a tray assembly within the interior volume 140 that comprises a tray housing 156 (or "carriage 156") pivotally coupled to the distribution cabinet 32 and a plurality of trays 158 coupled to the tray housing 156. The tray housing 156 may pivot/rotate outward from the interior volume 140 to facilitate access to the trays 158. The trays 158 themselves may pivot or otherwise move relative to the tray housing 156 (including being removable from the tray housing 156) to provide additional access to any given tray 158.

The '425 publication refers to the trays 158 as "splice trays" because they are intended to store fusion splice joints between the optical fibers of two different cables. Because the present disclosure relates to pre-terminated cables rather than ones that require splicing, the more generic term "distribution tray" or simply "tray" is used. The trays 158 are still intended to store joints between the optical fibers of two different cables, but the joints are in the form connection interfaces that are mated (i.e., coupled) together (e.g., by using respective adapters; not shown). The trays 158 may therefore be referred to as "patch trays 158" (or "adapter trays 158") and the distribution cabinet 32 as a "patch cabinet 32" or "patch enclosure 32".

It will be appreciated that FIG. 14 superimposes a portion of the pre-terminated fiber optic cable assembly 62 that includes the pulling grip assembly 60 over the distribution cabinet 32 merely to illustrate the general principle that that pulling grip assembly 60 may be used to route/pull the end portion of the pre-terminated cable 46 to its intended destination (the distribution cabinet 32). In some embodiments, the pulling grip assembly 60 may be used to route the end portion 44 all the way into the interior volume 140 of the distribution cabinet 32. Various features may be provided in the distribution cabinet 32 to assist with receiving the pre-terminated cable 46. Although FIG. 14 illustrates a transparent rear plate 160 without openings as a rear portion of the upper wall 150, such a plate may include different sized openings for different types of cables. For example, there may be openings sized to receive the larger, high fiber-count pre-terminated interconnect cables 20, and openings sized to receive the relative smaller fiber-count indoor cables 34. A front plate 162 defining a front portion of the upper wall 150 may also be removable to assist with accessing the pre-terminated cable 46 and other cables as they are routed into the distribution cabinet 32 (e.g., through the openings in the rear plate 160, if present). Additionally, the distribution cabinet 32 may include brackets 164 below the rear plate 160 that serve as mounting locations for the pre-terminated cable 46 and other cables. Apertures 166 or other mounting features may be provided on the brackets 164 for cooperating with complementary mounting features of clips (not shown), which may be integral with the cables (e.g., part of the furcation body 48) or mounted to the cables.

Ultimately the pulling grip assembly 60 is removed from the pre-terminated cable 46 to expose the end sections 52 (FIG. 4) of the subunits 22. This may be done before or after securing the pre-terminated cable 46 to the brackets 164. Regardless, by routing the pre-terminated cable 46 into the distribution cabinet 32 before removing the pulling grip assembly 60, the amount of further positioning/routing of the pre-terminated cable 46 is limited. This may be desirable because once the pulling grip assembly 60 is removed, the end sections 52 of the subunits 22 (and, therefore, the associated pre-terminated fiber end sections) are less protected, especially in embodiments where there are exposed lengths of the ribbons 28.

The design of the pulling grip assembly 60 facilitates removal in the manner described above (i.e., after routing into the distribution cabinet 32). The relatively short length discussed above is one aspect, allowing the removal to occur after routing the pre-terminated cable 46 into the distribution cabinet 32 without having to later store large lengths of cable slack in the distribution cabinet 32 or pull back lengths of the pre-terminated cable 46 from the distribution cabinet 32. As will also be appreciated, another aspect is that the steps to remove the pulling grip assembly 60 are minimal. If present, the set screw helping maintain the bayonet connection between the coupler 90 of the pulling grip assembly 60 and the shell 54 of the furcation body 48 is first removed. The pulling grip assembly 60 may then be removed from the pre-terminated cable 46 in a single step. That is, the design of the pulling grip assembly 60 is such that it can remain assembled during the removal; all components can be removed together. The removal is simply the reverse of the steps discussed with respect to FIGS. 12 and 13. Thus, the coupler 90 is rotated relative to the shell 54 of the furcation body 48 so that the bosses 78 on the shell 54 become aligned with the entrance (beginning) of the slots 102 in the coupler 90. The pulling grip assembly 60 may then be slid off the end portion 44 of the pre-terminated cable 46, as the bosses 78 are able to exit the slots 102 so as to no longer prevent such relative axial movement. Remaining steps to install the pre-terminated cable 46 may be minimal and do not involve the pulling grip assembly 60. For example, the end portion 44 may be ready for establishing connections to the indoor cables 34 after removing the protective material (e.g., heat shrink cover or plastic wrap) and organizing elements (e.g., bands 130) as needed, if any such items were initially applied to the end portion 44 prior to installing the pulling grip assembly 60. The connections between the subunits 22 of the pre-terminated cable 46 and the indoor cable 34 are ultimately stored in the trays 158 of the distribution cabinet 32.

Meanwhile, the pulling grip assembly 60 that was removed from the end portion 44 of the pre-terminated cable 46 may be kept for use with other pre-terminated cables designed the same as or similar to the pre-terminated cable 46. As can be appreciated, the pulling grip assembly 60 is a pre-engineered solution that provides for quick assembly onto and removal from the pre-terminated cable 46. This, in turn, may provide for an overall faster installation of the pre-terminated cable 46 in the field (compared to the time installation might otherwise take with conventional designs). The time and skill required for installation may be reduced compared to conventional designs such that overall costs associated with installation may also be lower. Furthermore, because the pulling grip assembly 60 may be re-used, the amount of materials associated with multiple installations may be reduced compared to conventional designs that cannot be re-used as a pre-engineered solution.

In addition to the size and installation advantages mentioned above, the pulling grip assembly 60 offers performance advantages as well. In particular, when the pulling grip assembly 60 is secured to the pre-terminated cable 46, the interior of the pulling grip assembly 60 that contains the pre-terminated fiber end sections of the pre-terminated cable 46 is sealed off from an exterior of the cable assembly 62. In other words, the pulling grip assembly 60 provides sealed protection for the pre-terminated fiber end sections. Moreover, the pulling grip assembly 60 is configured to maintain this sealed protection over an ambient temperate range of at least between −20 to 50° C. while applying a tensile load of at least 300 lbs to the distal end of the pulling grip assembly 60. This is due to a) the robust, sealed connection between the pulling grip assembly 60 and the furcation body 48; and b) the design of the pulling grip assembly 60 itself being robust in nature and sealed/closed off. Feature a) in the example embodiment discussed above is provided by the close-fitting relationship and bayonet connection between the coupler 90 of the pulling grip assembly 60 and the shell 54 of the furcation body 48, together with the first seal 82. Alternative connection types (e.g., threaded connections) that achieve a similar purpose will be appreciated by skilled persons. Feature b) in the example embodiment discussed above is provided by the seals between the various components that form the pulling grip assembly 60 (i.e., the second seal between the coupler 90 and the tube 92, and the fourth seal between the tube 92 and the end cap 94). Here again though, alternative designs that achieve a similar purpose will be appreciated by skilled persons.

It was mentioned above how the coupler 90, the tube 92, and the end cap 94 may be formed from metal, such as from stainless steel. Such a material not only has the advantage of resisting corrosion, but also provides the possibility to weld the components together to form the above-mentioned seals. The connections between the components and, therefore, the associated seals (i.e., the second seal and the fourth seal mentioned above) are permanent in nature. Such permanent seals/connections may help better maintain the sealed protection compared to non-permanent connections. It was also mentioned above how the ring 116 and/or the ring 120 may be used provide additional reinforcement, sealing, and/or protection in some embodiments. Thus, there is the opportunity to make the pulling grip assembly 60 even more robust and better capable of maintain the sealed protection at even higher loads, such as when more than 500 lbs of tensile load is applied to the distal end 88 of the pulling grip assembly 60.

The are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A pre-terminated fiber optic cable assembly, comprising:
   a cable jacket;
   distinct groups of optical fibers carried within the cable jacket and extending beyond a first end of the cable jacket;
   a furcation body positioned on the first end of the cable jacket such that the distinct groups of optical fibers extend beyond the furcation body, wherein the furcation body includes a shell and a polymer material occupying space within the shell around the distinct groups of optical fibers, the shell having a first portion that is received over the first end of the cable jacket and a second portion that defines an end of the shell not received over the cable jacket, the second portion having a reduced outer diameter compared to the first portion;
   a plurality of connection interfaces each terminating one or more respective groups of the distinct groups of optical fibers that extend beyond the furcation body to define pre-terminated fiber end sections of the distinct groups of optical fibers; and
   a pulling grip assembly having a proximal end selectively secured to the furcation body, a distal end opposite the proximal end, and an interior between the proximal end and the distal end that contains the pre-terminated fiber end sections, wherein the pulling grip assembly comprises:
      a coupler defining the proximal end of the pulling grip assembly, wherein the coupler is received over the second portion of the shell but not the first portion of the shell when the coupler is secured to the furcation body, and wherein a first seal is maintained between the coupler and the furcation body when the coupler is secured to the furcation body;
      a tube extending from the coupler and over the pre-terminated ends of the distinct groups of optical fibers; and
      an end cap secured to the tube to form a closed end of the pulling grip assembly, wherein the end cap includes a pulling eye that defines the distal end of the pulling grip assembly;
   wherein:
      the interior of the pulling grip assembly is sealed off from an exterior of the cable assembly to provide sealed protection for the pre-terminated fiber end sections; and
      the pulling grip assembly is configured to maintain the sealed protection over an ambient temperate range of at least between −20 to 50° C. while applying a tensile load of at least 300 lbs to the distal end of the pulling grip assembly.

2. The pre-terminated fiber optic cable assembly of claim 1, wherein an end portion of the coupler that is received on the second portion of the shell when the coupler is secured to the furcation body has an outer diameter that is approximately the same as an outer diameter of the first portion of the shell.

3. The pre-terminated fiber optic cable assembly of claim 1, further comprising an o-ring positioned between the furcation body and the coupler to form the first seal.

4. The pre-terminated fiber optic cable assembly of claim 1, wherein the coupler is selectively secured to the furcation body through a bayonet connection.

5. The pre-terminated fiber optic cable assembly of claim 1, wherein a second seal is formed between the tube and the coupler.

6. The pre-terminated fiber optic cable assembly of claim 5, wherein the coupler and the tube are comprised of metal, and wherein the tube is welded to the coupler to form the second seal.

7. The pre-terminated fiber optic cable assembly of claim 1, wherein the tube comprises a corrugated metal inner tube and a braided metal cover received over at least a portion of the inner tube.

8. The pre-terminated fiber optic cable assembly of claim 1, wherein a third seal is formed between the end cap and the tube.

9. The pre-terminated fiber optic cable assembly of claim 8, wherein the tube and the end cap are comprised of metal, and wherein the end cap is welded to the tube to form the third seal.

10. The pre-terminated fiber optic cable assembly of claim 1, wherein the plurality of connection interfaces comprises a plurality of ferrules that each terminates either a single group of the distinct groups of optical fibers or multiple groups of the distinct groups of optical fibers.

11. The pre-terminated fiber optic cable assembly of claim 10, wherein the plurality of connection interfaces comprise incomplete optical connectors.

12. The pre-terminated fiber optic cable assembly of claim 1, wherein each group of the distinct groups of optical fibers comprises an optical fiber ribbon.

13. The pre-terminated fiber optic cable assembly of claim 12, wherein the optical fiber ribbons collectively comprise at least 3456 optical fibers.

14. The pre-terminated fiber optic cable assembly of claim 1, wherein the pulling grip assembly has a maximum outer diameter of less than 1.34 inches (53 mm) measured in a plane perpendicular to a longitudinal axis of the pulling grip assembly.

15. The pre-terminated fiber optic cable assembly of claim 1, further comprising:
   a plurality of subunits within the cable jacket, wherein each subunit includes a subunit jacket and several of the distinct groups of optical fibers carried within the subunit jacket, each subunit of the plurality of subunits includes a subunit end section extending from the furcation body, and wherein each of the subunit end sections includes the distinct groups of optical fibers of the associated subunit extending from the associated subunit jacket.

16. The pre-terminated fiber optic cable assembly of claim 15, wherein the subunit end sections are group in pairs, and wherein each of the pairs has a different length such that the plurality of connection interfaces associated with the pairs have a staggered arrangement.

17. A pre-terminated fiber optic cable assembly, comprising:
- a cable jacket;
- a plurality of subunits within the cable jacket, wherein each subunit includes a subunit jacket and several optical fiber ribbons carried within the subunit jacket;
- a furcation body comprising a shell positioned on the first end of the cable jacket and a polymer material securing the shell to the cable jacket and at least some of the subunit jackets, the shell having a first portion that is received over the first end of the cable jacket and a second portion that defines an end of the shell not received over the cable jacket, the second portion having a reduced outer diameter compared to the first portion, and wherein:
  - each subunit of the plurality of subunits includes a subunit end section extending from the furcation body,
  - each of the subunit end sections includes the several optical fiber ribbons of the associated subunit extending from the associated subunit jacket, and
  - the several optical fiber ribbons of the plurality of subunits collectively comprise at least 3456 optical fibers; and
- a plurality of multifiber ferrules each terminating one or more of the several optical fiber ribbons that extend from the associated subunit jacket to define pre-terminated fiber end sections; and
- a pulling grip assembly having a proximal end selectively secured to the shell of the furcation body, a distal end opposite the proximal end, and an interior between the proximal end and the distal end, wherein the pulling grip assembly comprises:
  - a coupler defining the proximal end of the pulling grip assembly, wherein the coupler is received over the second portion of the shell but not the first portion of the shell when the coupler is secured to the furcation body, and wherein a first seal is maintained between the coupler and the furcation body when the coupler is secured to the furcation body;
  - a tube extending from the coupler and over the pre-terminated ends of the distinct groups of optical fibers; and
  - an end cap secured to the tube to form a closed end of the pulling grip assembly, wherein the end cap includes a pulling eye that defines the distal end of the pulling grip assembly;
- wherein:
  - the pulling grip assembly has a maximum outer diameter of less than 1.34 inches (53 mm) measured in a plane perpendicular to a longitudinal axis of the pulling grip assembly and contains the pre-terminated fiber sections associated with the at least 3456 optical fibers within the interior of the pulling grip assembly;
  - the interior of the pulling grip assembly is sealed off from an exterior of the cable assembly to provide sealed protection for the pre-terminated fiber end sections; and
  - the pulling grip assembly is configured to maintain the sealed protection over an ambient temperate range of at least between −20 to 50° C. while applying a tensile load of at least 300 lbs to the distal end of the pulling grip assembly.

18. A fiber optic cable assembly, comprising:
- a cable jacket;
- distinct groups of optical fibers carried within the cable jacket and extending beyond a first end of the cable jacket;
- a furcation body positioned on the first end of the cable jacket such that the distinct groups of optical fibers have respective fiber end sections extending beyond the furcation body, wherein the furcation body includes a shell and a polymer material occupying space within the shell around the distinct groups of optical fibers, the shell having a first portion that is received over the first end of the cable jacket and a second portion that defines an end of the shell not received over the cable jacket, the second portion having a reduced outer diameter compared to the first portion;
- a pulling grip assembly having a proximal end selectively secured to the furcation body, a distal end opposite the proximal end, and an interior between the proximal end and the distal end that contains the fiber end sections, wherein the pulling grip assembly comprises:
  - a coupler defining the proximal end of the pulling grip assembly, wherein the coupler is received over the second portion of the shell but not the first portion of the shell when the coupler is secured to the furcation body, and wherein a first seal is maintained between the coupler and the furcation body when the coupler is secured to the furcation body;
  - a tube extending from the coupler and over the pre-terminated ends of the distinct groups of optical fibers; and
  - an end cap secured to the tube to form a closed end of the pulling grip assembly, wherein the end cap includes a pulling eye that defines the distal end of the pulling grip assembly;
- wherein:
  - the interior of the pulling grip assembly is sealed off from an exterior of the cable assembly to provide sealed protection for the fiber end sections; and
  - the pulling grip assembly is configured to maintain the sealed protection over an ambient temperate range of at least between −20 to 50° C. while applying a tensile load of at least 300 lbs to the distal end of the pulling grip assembly.

19. The fiber optic cable assembly of claim 18, wherein an end portion of the coupler that is received on the second portion of the shell when the coupler is secured to the furcation body has an outer diameter that is approximately the same as an outer diameter of the first portion of the shell.

20. The pre-terminated fiber optic cable assembly of claim 18, further comprising an o-ring positioned between the furcation body and the coupler to form the first seal.

* * * * *